UNITED STATES PATENT OFFICE.

ERNEST WALTER, OF MONTCLAIR, NEW JERSEY.

PROCESS OF MAKING POROUS CONCRETE.

1,313,931.      Specification of Letters Patent.      Patented Aug. 26, 1919.

No Drawing.      Application filed October 31, 1918. Serial No. 260,442.

*To all whom it may concern:*

Be it known that I, ERNEST WALTER, a citizen of the United States, and a resident of Montclair, county of Essex, and State of New Jersey, have invented certain new and useful Improvements in Processes of Making Porous Concrete, of which the following is a specification.

This invention relates to a process for making porous concrete.

The object of the invention is to make a porous concrete well adapted for a variety of uses in building purposes.

The porous concrete is produced by incorporating with the cementitious material small pieces of material which is adapted for extraction after the concrete has set, thereby leaving the concrete porous.

The material used for this purpose should be of a substantially neutral character with respect to Portland cement, gypsum and the like cementitious material, should be insoluble in water, should be capable of being mixed at ordinary temperatures above freezing and should be readily extractable by heat or by extracting agents which do not injure the concrete.

As to the extractable material, there are a number of materials and mixtures of materials that are adapted for this use having qualities that are necessary to a successful practice of the process, these materials being insoluble in water, one such material, for instance, being paraffin wax.

The extractable material is preferably provided in the form of balls of about $\frac{1}{32}$ to $\frac{3}{16}$ of an inch in diameter, though there may be considerable variation in the size of the balls and the pieces of paraffin need not necessarily be in the form of balls but may be of other shapes.

The particles of extractable material are incorporated with the other ingredients of the mixture, as Portland cement, water, sand, etc., which can be done at ordinary temperatures.

After the concrete has been mixed and put in place, as in molds or the like, it is permitted to set.

During the setting of the concrete it is preferably maintained at a temperature slightly under the melting point of the extractable material so as to avoid breakage, which may result from expansion when the concrete is subsequently subjected to heat sufficient to melt the extractable material.

When set sufficiently, the concrete is subjected, preferably gradually, to heat high enough to melt the extractable material, whereupon the molten paraffin flows out, leaving the concrete porous.

Such extractable material as still remains may be removed by subjecting the concrete to the action of steam which may be superheated and so distilled by steam distillation at a temperature which is much lower than the boiling point of the extractable material, the steam and the vapors of the extractable material forming a vapor mixture. The extractable material may also be removed by simple distillation or by means of solvents, which, in the case of paraffin, may be gasolene, benzene, carbon tetrachlorid and the like.

The concrete is then preferably treated with a hardening and strengthening agent, as by treatment with a solution of sodium silicate.

Finally the outer surface may be given a cement wash or the like to strengthen the concreate and to impart desirable surface qualities thereto. The concrete may, of course, be reinforced with suitable, preferably metallic, reinforcing means, if desired.

I claim:

1. The process of making porous concrete which consists in incorporating with the ingredients thereof particles of material which is insoluble in water and which melts at a temperature which will not injure the concrete, permitting the concrete to set, and treating the concrete for extraction of such extractable material.

2. The process of making porous slabs of cementitious matter which consists in incorporating small particles of extractable material insoluble in water with the cementitious matter before it sets, then permitting the cementitious matter to set, and then extracting the material, leaving the slab porous.

3. The process of making porous concrete which consists in incorporating small particles of material insoluble in water and which will melt at a temperature which will not injure the concrete with the ingredients thereof, maintaining the concrete during setting at a temperature somewhat under the melting point of the material, and heating the concrete after it has set to a temperature sufficient to melt the material, whereupon the material is removed, leaving the concrete porous.

4. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, and treating the concrete for extraction of such material, leaving the concrete porous.

5. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, and exposing it to a temperature high enough to melt out the extractable material, leaving the concrete porous.

6. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, exposing it to a temperature high enough to melt out the extractable material, and subjecting the concrete to the action of a solvent of the extractable material to remove any remaining parts of it, leaving the concrete porous.

7. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, and exposing it to a temperature high enough to melt out the extractable material, and after this to a current of steam to remove any remaining parts of this material, leaving the concrete porous.

8. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, and exposing the concrete to a current of steam to melt out the extractable material and remove the remaining parts by steam distillation, leaving the concrete porous.

9. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, and exposing the concrete to a temperature high enough to melt out the extractable material, and after this to a current of super-heated steam to remove the remaining parts by steam distillation, leaving the concrete porous.

10. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, treating the concrete for extraction of such material, leaving the concrete porous, and treating the porous concrete so obtained with a hardening agent.

11. The process of making porous concrete which consists in incorporating with the ingredients thereof small particles of material which is insoluble in water and which does not affect the setting of the concrete, and which itself is not affected by the concrete and which melts at a temperature which will not injure the concrete, permitting the concrete to set, treating the concrete for extraction of such material, leaving the concrete porous, and applying a surface finish of cementitious material to the outer surface of this porous concrete.

12. The process of making porous slabs of cementitious matter which consists in incorporating small particles of extractable material, insoluble in water, with the cementitious matter before it sets, having reinforcing means in said mass, then permitting the cementitious matter to set, and then extracting the extractable material.

13. The process of making porous slabs of cementitious matter which consists in incorporating small particles of extractable material, insoluble in water, with the cementitious matter before it sets, having reinforcing means in said mass, then permitting the cementitious matter to set, then extracting the extractable material, and applying a surface finish of cementitious matter to the outer surface of the concrete.

14. The process of making porous slabs of cementitious matter which consists in incorporating small particles of extractable material, insoluble in water, with the cementitious matter before it sets, and applying a surface finish of cementitious matter to the outer surface of the concrete.

In testimony that I claim the foregoing, I have hereto set my hand, this 30th day of October, 1918.

ERNEST WALTER.